March 15, 1932. C. F. M. VAN BERKEL 1,849,340
FEED MECHANISM FOR SLICING MACHINES
Filed Jan. 12, 1928

Inventor
Cornelis F. M. van Berkel
By Nissen & Crane
Attys.

Patented Mar. 15, 1932

1,849,340

UNITED STATES PATENT OFFICE

CORNELIS F. M. VAN BERKEL, OF WASSENAAR, NETHERLANDS, ASSIGNOR TO U. S. SLICING MACHINE COMPANY, OF LA PORTE, INDIANA, A CORPORATION OF INDIANA

FEED MECHANISM FOR SLICING MACHINES

Application filed January 12, 1928, Serial No. 246,331, and in Germany January 18, 1927.

This invention relates to mechanism for feeding the work support of a slicing machine toward the cutting plane of a slicing knife, and has for one of its objects the provision of feed mechanism of the class named which shall be of improved construction and operation.

A further object is to provide feed mechanism which will produce feeding movement just before and also just after the reciprocating work support reaches the end of its travel.

Other objects and advantages will appear from the following description.

The invention is exemplified in the combination and arrangement of parts shown in the accompanying drawings and described in the following specification, and it is more particularly pointed out in the appended claims.

In the drawings—

Figure 1:
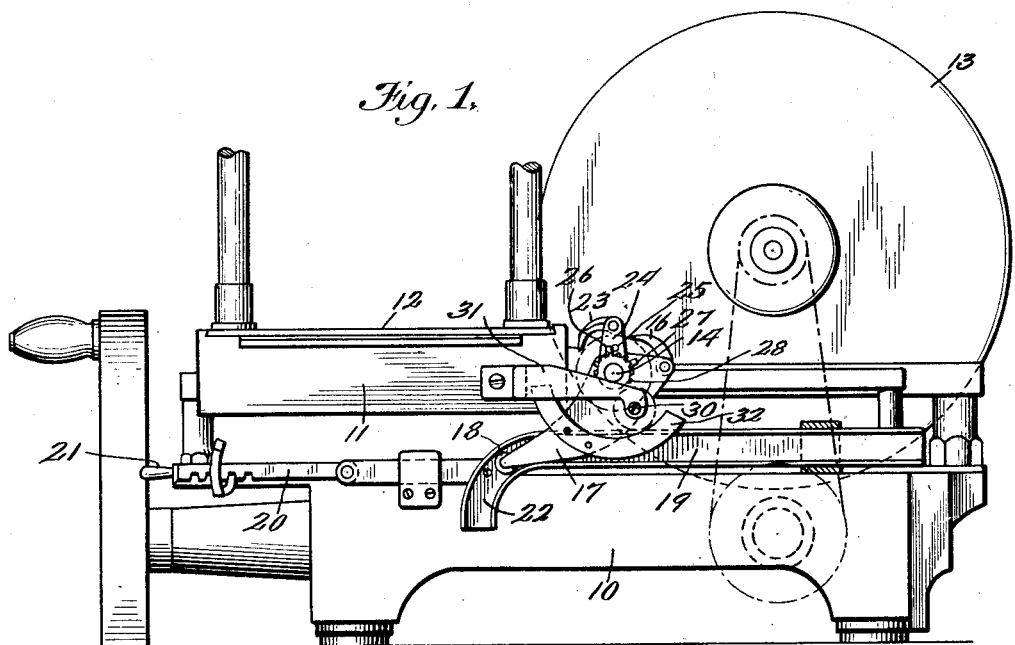
Fig. 1 is an elevation of a slicing machine showing one embodiment of the present invention applied thereto.

In slicing machines having reciprocating work supports it is desirable to effect the feeding movement of the work support while the feed table is moving through as small a portion of its travel as possible adjacent the extremity of the path of movement thereof. This makes it desirable to impart feeding movement to the support both before and after the reversal of the direction of movement of the reciprocating carriage. Where the feeding movement has been effected by an adjustable stop, this result has heretofore not been possible, because the adjustable stop could effect feeding movement only during the movement of the carriage in one direction. The present invention provides means for imparting feeding movement to the work support both before and after reversal of the movement of the reciprocating carriage.

In the embodiment of the invention shown, the numeral 10 designates the frame of a slicing machine having a reciprocating carriage 11 thereon provided with a work support 12 which is intermittently fed toward the plane of the slicing knife 13 by a feed screw 14 connected with the work support in the usual manner. A ratchet wheel 15 is secured to the feed screw 14 and is engaged by a spring-held pawl 16 carried by an operating lever 17 loosely pivoted on the feed screw 14. The lever 17 carries a roller 18 which engages a channel cam member 19 slidably mounted on the frame 10 and adjustable along the frame by means of a toothed link 20 and handle 21. The cam member 19 is provided with a downwardly curved portion 22 in which the roller 18 moves as the table 11 approaches the end of its path of travel. It will be apparent that the latter part of the movement of the table before it reaches dead-center will cause the lever 17 to be swung downwardly and that the first part of the reverse travel of the carriage will move the lever 17 upwardly. During the downward movement of the lever, the pawl 16 will drive the ratchet wheel 15 to rotate the screw 14 and advance the work support. During the first part of the reverse movement of the reciprocating carriage, the pawl 16 will move idly back to its initial position.

An additional pawl 23 is provided for imparting feed movement to the screw 14 during the return of the pawl 16. The pawl 23 is mounted on an arm 24 loosely journaled on the screw 14 and having a pin 25 which projects between stops 26 and 27 carried on the hub of a pinion 28. The stops 26 and 27 are adjustable toward and from each other on their supporting hub in any suitable manner. The pinion 28 is freely journaled on the end of the screw spindle 14. An idler pinion 29 is journaled on a stud shaft 30 carried by a bracket 31 mounted on the reciprocating carriage 11. The pinion 29 meshes with an arcuate rack 32 secured to the arm 17 by screws 33 and a spacer block 34.

Figure 2:
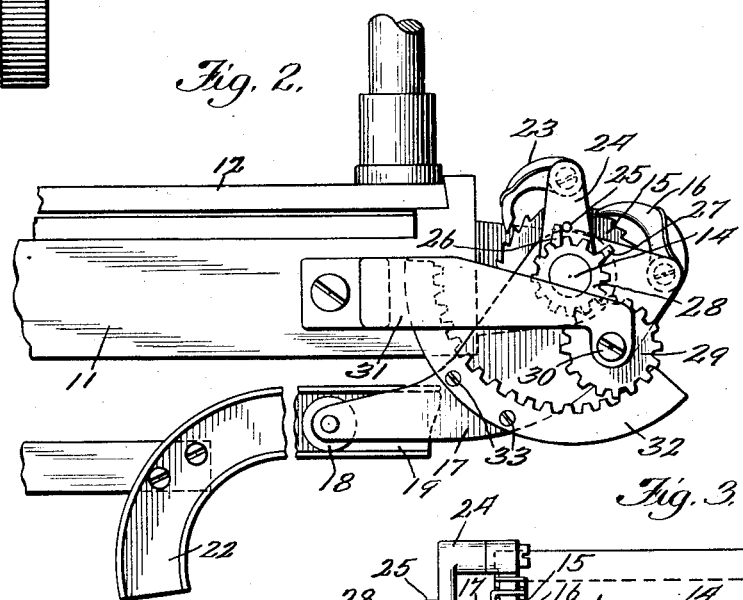
Fig. 2 is an elevation of the operating mechanism for the feed screw on a larger scale than Fig. 1.
Figure 3:
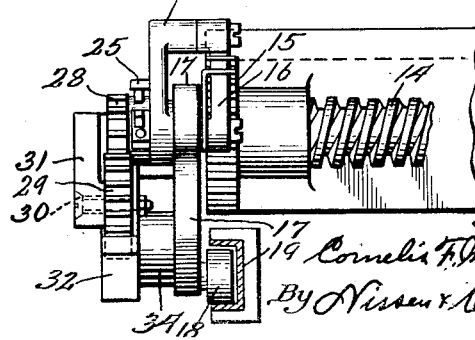
Fig. 3 is a view looking from the right in Fig. 2.

During the first part of the slicing movement of the reciprocating table 11, the lever 17 will be moved in a clockwise direction, as viewed in Fig. 2. This will drive the pinion 28 in a counter-clockwise direction by the idler 29 and will cause the stop 27 to engage the pin 25 and impart a feeding movement to the pawl 23. It will thus be seen that as the reciprocating carriage 11 approaches the end of its stroke the feed screw will be operated by the pawl 16 and the pawl 23 will be retracted. After the direction of movement of the reciprocating table is reversed, feeding movement will be imparted to the ratchet wheel 15 by the pawl 23 and the pawl 16 will be retracted. Thus the feed screw is operated during a short portion of its travel just before and just after the direction of movement is reversed. The space required for the feeding movement is therefore less than is necessary where the total feeding operation takes place while the table is traveling in a single direction.

I claim:—

1. A slicing machine comprising a reciprocating part, a feed member, two operating elements for said feed memeber, and means for actuating said operating elements during movement of said reciprocating part in different directions respectively to impart feeding movement to said feed member in the same direction.

2. A slicing machine comprising a reciprocating work support, a feed member for advancing material on said work support, two operating elements for said feed member, means for operating one of said elements when said work support approaches the limit of its movement in one direction to advance the material on said work support, and means for operating the other of said elements during the beginning of the reverse movement of said work support in a direction also to advance the work on said work support.

3. A slicing machine comprising a reciprocating work support, a ratchet wheel for advancing material on said work support, a pair of pawls for rotating said ratchet wheel, means for operating one of said pawls to rotate said ratchet wheel when said work support approaches the limit of its travel, and means for operating the other of said pawls to rotate said ratchet wheel at the beginning of the reverse movement of said work support.

4. A slicing machine comprising a platform, a work support arranged to reciprocate on said platform, a cam guide mounted on said platform, feed mechanism for advancing material on said work support, means engaging said cam guide for operating said feed mechanism, said cam guide being shaped to actuate said feed mechanism operating means during travel of said work support in both directions adjacent one end of the path of travel thereof, and means for adjusting the position of said cam guide on said platform.

5. A slicing machine comprising a feed screw, a ratchet wheel for operating said feed screw, a pair of pawls for rotating said ratchet wheel, means for reciprocating said pawls, and direction reversing mechanism between said last-named means and one of said pawls.

6. Feed mechanism for slicing machines comprising a feed screw, a ratchet wheel secured to said feed screw, a pair of pawls for rotating said ratchet wheel, a lever for actuating said pawls, one of said pawls being directly connected with said lever, and reversing gearing interposed between said lever and the other of said pawls.

7. A slicing machine comprising a reciprocating work support, a feed screw mounted on said work support, a ratchet wheel secured to said feed screw, a pair of pawls for rotating said ratchet wheel, a lever for actuating said pawls, one of said pawls being directly mounted on said lever, reversing gearing interposed between said lever and the other of said pawls, and a cam guide for oscillating said lever, said cam guide having a curved portion co-operating with said lever to impart movement thereto in opposite directions when said work support approaches and leaves one end of its path of movement.

8. A slicing machine comprising a supporting platform, a work support mounted to reciprocate on said platform, a feed screw journaled on said work support, a ratchet wheel secured to said feed screw, a pair of pawls for rotating said ratchet wheel, a lever for actuating said pawls, one of said pawls being directly connected with said lever, reversing gearing interposed between said lever and the other of said pawls, a cam guide mounted on said platform for operating said lever, said cam guide having a curved portion engaging said lever to impart reciprocation thereto during the movement of said work support toward and from one extremity of its path of movement, and means for adjusting the position of said cam guide on said platform.

9. A slicing machine comprising a feed member, two operating elements for said feed member arranged to operate said feed member in the same direction, and a single controlling mechanism movable in opposite directions adapted when moved in one direction to cause one of the operating elements to acutate said feeding mechanism and when moved in the opposite direction to cause the other of the operating elements to actuate said feed member.

10. A slicing machine comprising a reciprocating part, a feed member, two operating elements for said feed member, and means for actuating said operating elements during movement of said reciprocating part as it is approaching the limit of its movement in one direction and as it begins its return movement from that limit.

11. A slicing machine comprising a feed member, a ratchet wheel for actuating the feed member, pawls engaging the ratchet each adapted to rotate the ratchet in the same direction, and a single controlling mechanism movable in opposite directions adapted when moved in one direction to cause one pawl to actuate said feed member and when moved in the opposite direction to cause the other pawl to actuate said feed member.

12. Feed mechanism for slicing machines comprising a feed screw, a ratchet wheel secured to said feed screw, a pair of pawls for rotating said ratchet wheel in the same direction, a lever for actuating said pawls, one of said pawls being directly connected with said lever, and reversing gearing interposed between said lever and the other of said pawls for moving said last-mentioned pawl in the same direction as the first-mentioned pawl when rotating said feed screw.

13. A slicing machine comprising a reciprocating work support, a feed screw mounted on said work support, a pawl pivotally mounted on a lever to engage and rotate the feed screw as the lever moves in one direction, a second pivoted pawl for rotating the feed screw in the same direction as said first pawl and moved in a direction reverse to that of the lever by reversing mechanism comprising a rack on the lever meshing with gears operatively connected to the second pawl.

14. A slicing machine comprising a reciprocatory work support, a feed screw mounted on said work support, a pawl pivotally mounted on a lever to engage and rotate the feed screw as the lever moves in one direction, a second pivoted pawl for rotating the feed screw in the same direction as said first pawl and moved in a direction reverse to that of the lever by reversing mechanism comprising a rack on said lever meshing with gears operatively connected to the second pawl, and a cam for moving said lever in opposite directions.

15. A slicing machine comprising a base member, a carriage mounted for reciprocation on said base member, a feed screw on said carriage, a pawl pivotally mounted on a member which is concentrically pivoted relative to the axis of said feed screw, a ratchet on said feed screw adapted to be engaged by said pawl, an extension on the member which supports said pawl, a cam on said base member adapted to actuate said extension, a second pawl pivoted to the member which supports said first pawl, means for moving said pawl about its pivot in a direction opposite to the movement of said first pawl about its pivot comprising a gear concentrically mounted with respect to the said second mentioned pawl and operatively connected therewith, a second gear on the member which supports said first mentioned pawl, and an idler gear interposed between said first two mentioned gears.

16. A slicing machine comprising a base member, a carriage mounted for reciprocation on said base member, a feed screw on said carriage, a pawl pivotally mounted on a member which is concentrically pivoted relative to the axis of said feed screw, a ratchet on said feed screw adapted to be engaged by said pawl, an extension on the member which supports said pawl, a cam on said base member adapted to actuate said extension, a second pawl pivoted to the member which supports said first pawl, means for moving said pawl about its pivot in a direction opposite to the movement of said first pawl about its pivot comprising a gear concentrically mounted with respect to the said second mentioned pawl, and having a lost motion connection therewith, a second gear on the member which supports said first mentioned pawl, and an idler gear interposed between said first two mentioned gears.

17. A slicing machine comprising a reciprocating work support, a feed screw mounted on said work support, a ratchet wheel secured to said feed screw, a pair of pawls for rotating said ratchet wheel, a lever for actuating said pawls, one of said pawls being directly mounted on said lever, reversing gearing interposed between said lever and the other of said pawls, a lost motion connection between said gearing and said pawl so that the full amount of movement imparted to said gearing will not be imparted to said pawl, and means for oscillating said lever in opposite directions as said work support is reciprocated in opposite directions, the movement of said lever in opposite directions imparting a feed movement to said ratchet by means of said pawls, each movement of said lever about its pivot causing actuation of said feed screw.

18. In a slicing machine, the combination with a slicing knife of a support for the material to be sliced, a feed screw for feeding said support, means movable in opposite directions for rotating said feed screw, and means operable by said rotating means to rotate said feed screw always in the same direction on successive movements of said rotating means in opposite directions.

19. A slicing machine comprising a feed member, operating mechanism for moving said feed member in the same direction at all times and on successive movements of a portion of said operating mechanism in opposite directions, said operating mechanism comprising a member movable in opposite directions and means operated thereby for moving said feed member in the same direction as said actuating member moves alternately in opposite directions, said feed member being operable on both movements of said actuating member.

In testimony whereof I have signed my name to this specification on this 21st day of December, A. D. 1927.

CORNELIS F. M. van BERKEL.